United States Patent [19]

Mieth

[11] Patent Number: 5,086,816
[45] Date of Patent: Feb. 11, 1992

[54] ASSEMBLY FOR THE TRANSFER, MASS DETERMINATION AND MASS SEPARATION OF FLUENT MATERIAL, PARTICULARLY FOR BEVERAGES SUCH AS MILK OR BEER

[75] Inventor: Hans O. Mieth, Schnakenbek, Fed. Rep. of Germany

[73] Assignee: Otto Tuchenhagen GmbH & Co. KG, Büchen, Fed. Rep. of Germany

[21] Appl. No.: 563,665

[22] Filed: Aug. 3, 1990

Related U.S. Application Data

[63] Continuation of Ser. No. 302,597, filed as PCT/EP88/00521, Jun. 11, 1988, abandoned.

[30] Foreign Application Priority Data

Jun. 13, 1987 [DE] Fed. Rep. of Germany ....... 3719775

[51] Int. Cl.$^5$ ............................................. G01G 17/04
[52] U.S. Cl. ..................................... 141/83; 141/231; 222/77; 222/608; 177/136
[58] Field of Search ............... 177/136, 139, 145, 244, 177/161; 141/83, 94, 130, 248, 231; 222/77, 608

[56] References Cited

U.S. PATENT DOCUMENTS

| | | | |
|---|---|---|---|
| 818,505 | 4/1906 | Wolff | 177/244 |
| 1,201,819 | 10/1916 | Hald | 222/608 X |
| 1,390,508 | 9/1921 | Crowder | 222/608 X |
| 2,482,027 | 9/1949 | Poole | 177/136 |
| 2,893,602 | 7/1959 | Barber et al. | 222/77 |
| 3,095,206 | 6/1963 | Fresia et al. | 222/608 X |
| 3,138,217 | 6/1964 | Bahr et al. | 141/83 |
| 3,353,572 | 11/1967 | Anderson et al. | 141/83 |
| 3,404,742 | 10/1968 | Bonneric | 141/83 |
| 3,734,215 | 5/1973 | Smith | 177/83 |
| 3,971,451 | 7/1976 | Norberg | 177/145 |
| 4,337,878 | 7/1982 | Brock | 222/77 |
| 4,427,133 | 1/1984 | Kierbow et al. | 222/77 |
| 4,481,985 | 11/1984 | Bauder et al. | 141/1 |
| 4,669,634 | 6/1987 | Leroux | 222/77 |
| 4,733,971 | 3/1988 | Pratt | 141/83 |

FOREIGN PATENT DOCUMENTS

| | | | |
|---|---|---|---|
| 0823537 | 9/1969 | Canada | 177/136 |
| 0807493 | 7/1949 | Fed. Rep. of Germany | 141/83 |
| 3027859 | 3/1982 | Fed. Rep. of Germany | 177/145 |
| 3228714 | 2/1984 | Fed. Rep. of Germany . | |
| 8535376 | 7/1986 | Fed. Rep. of Germany . | |
| 3545160 | 7/1987 | Fed. Rep. of Germany . | |
| 0642629 | 8/1928 | France | 141/130 |
| 87/02127 | 4/1987 | PCT Int'l Appl. | 177/136 |
| 0723377 | 3/1980 | U.S.S.R. | 222/77 |
| 0872968 | 10/1981 | U.S.S.R. | 177/145 |
| 0646109 | 11/1950 | United Kingdom | 222/608 |
| 2109565 | 6/1983 | United Kingdom | 177/136 |
| 83/02874 | 9/1983 | World Int. Prop. O. . | |

Primary Examiner—Henry J. Recla
Assistant Examiner—Casey Jacyna
Attorney, Agent, or Firm—Lane, Aitken & McCann

[57] ABSTRACT

A fluent material is transferred from at least one first vessel into at least one second vessel by being advanced at first into a metering vessel arranged ahead of the second vessel and weighed therein. There is an inlet for the fluent material to and an outlet for the fluent material from the metering vessel, through which on the one hand the metering vessel is loadable from the first vessel and dischargeable into the second vessel.

The metering vessel has a degree of freedom of displacement only in the direction of its weight force component measurable by the forces measuring device in view of the support plane. The section of the inlet conduit either enters the inlet of the metering vessel contact-free or is connected thereto resiliently or is connectable thereto, and the section of the outlet conduit from the metering vessel either emerges therefrom contact-free or is resiliently connected thereto or is connectable thereto.

12 Claims, 6 Drawing Sheets

ASSEMBLY FOR THE TRANSFER, MASS DETERMINATION AND MASS SEPARATION OF FLUENT MATERIAL, PARTICULARLY FOR BEVERAGES SUCH AS MILK OR BEER

This application is a continuation of application Ser. No. 07/302,597, filed as PCT/EP88/00521, Jun. 11, 1988, now abandoned.

The invention relates to an assembly for the transfer, mass determination and mass separation of fluent material, particularly for beverages such as milk or beer, according to the preamble of the main claim.

The assembly of the above-indicated category substantially corresponds to the assembly according to DE-PS 35 45 160. In contrast to the assembly of the older protective right is the present assembly based on at least one metering vessel equipped with an inlet and an outlet for the fluent material stacked in the metering vessel.

The restriction effected in DE-PS 35 45 160 to at least two metering vessels, which are each connected via controllable valve arrangements on one hand with an inlet conduit for filling from the supply vessel and on the other hand with an outlet conduit for emptying into the collector vessel is abandoned. Particularly the feature of a connection between inlet conduit and metering vessel on one hand as well as outlet conduit and metering vessel on the other hand in the sense of a temporally unlimited, constant actual tubing is omitted as feature essential for the category in view of the broader category. As indicated above already, the assembly according to DE-PS 35 45 160 is restricted to at least two metering vessels which are each connected with an inlet conduit and an outlet conduit. In order to avoid any effect of force acting on the metering vessels via these conduits during weighing, the connections of the metering vessels and the associated tubing sections in the region between metering vessel and support plane must be extraordinarily resilient. Since the metering vessels undergo according to the invention only minor displacements in parallel to the support plane, the demands to be placed on these tubing connections are not as high by far as is the case for the assemblies according to the state of the art, which show pendantly suspended weighing tanks (DE 33 32 434 C 1, DE-OS 28 21 372). Yet, high metering accuracy in the weight force determination of fluent material stacked in the metering vessel with metering vessels having the inlet and outlet conduits connected also during the weighing can generally be realized only with high structural expenditure.

Even when disregarding the disadvantages of assemblies according to the state of the art having the metering vessels pendantly suspended owing to the unavoidability of effects of force due to connected conduits at the metering vessel, there are further disadvantages both in view of assemblies according to DE-PS 35 45 160 and in view of those according to the instant invention. Firstly, a pendantly suspended metering vessel as compared to a fixed one within the overall assembly requires more space, secondly, a metering vessel which can oscillate requires a relatively long period of time to achieve the steady state necessary for weighing. This period of time as a rule is not available for assemblies for the transfer, mass determination and mass separation of fluent material.

It is the object of instant invention to simplify the assembly according to DE-PS 35 45 160 as a whole as well as to improve and develop it in such a manner that the determination of the weight force of the fluent material stacked in the metering vessel is effected with still higher accuracy and as extensively as possible free of external and internal effects of force falsifying the measuring result.

This object is achieved according to the characterizing features of the main claim.

Advantageous embodiments of the assembly according to the invention and advantageous methods using these assemblies are described in the sub-claims.

Since oscillation of the metering vessel is no longer allowed, the highly elastic tubing connection to the metering vessel is no longer required as were obligatory according to the state of the art. Only the minor lifting motion or the displacement motion, respectively, of the metering vessel during the loading of the weighing cell, which lies in the millimeter range, must be taken in account in a metering vessel having conduits connected also during the weighing by means of suitably elastic tubing connections. The other conduit arrangements according to the invention indicated as alternatives in the characterizing clause of the main claim guarantees a weighing which is free of effects of force from the start.

In order to operate the assembly according to the invention with a single metering vessel without necessitating renunciation to a continuous advance of the fluent material to be transferred from at least one first vessel into at least one second vessel there is provided by an advantageous development of the assembly according to the invention that the inlet conduit section emerges from a first storage vessel and the outlet conduit section enters a second storage vessel. The storage vessel disposed ahead of the metering vessel must for this purpose be dimensioned so that the fluent material continuously further advanced during the weighing and the emptying of the sole metering vessel can be stored therein. The storage vessel disposed following the sole metering vessel is for safety reasons expediently so dimensioned that it can accept the entire content of the completely filled metering vessel.

According to an advantageous embodiment of the assembly according to the invention it is provided that the support plane is configured as a frame, wherein, according to a further advantageous embodiment, the degree of freedom of displacement of the metering vessel is achieved by beddings within the frame.

An advantageous development of the assembly according to the invention provides for the bedding of the metering vessel to use means for radial fixing which engage at the metering vessel and transmit exclusively traction forces.

Means of such kind may be for instance ropes or chains. The two last-indicated bedding alternatives are recommended by their small susceptibility to corrosion and the fact that the maintenance expense required is negligible.

In a further advantageous embodiment of the bedding, the upper and lower pivot pins are guided by at least three backing rolls which in turn are journalled for instance by means of antifriction bodies. By this arrangement it is achieved that the forces to be overcome during the transit from the static friction to roll friction are very small, whereby the measuring sensitivity of the assembly, particularly in the case of very small mass alterations, is markedly increased. Such small mass alterations are impressed on the metering vessel for instance in the calibration test, which in contrast to the normal measuring operation of the assembly demands a permanent, static loading of the forces measuring device by the metering vessel. In the normal measuring operation, on the one hand, there are working all aggregates provided for the operation of the assembly, so that the influence of static friction in the bedding is overcome to begin with by the occurring vibrations, on the other hand, in each renewed attachment of the metering vessel to the forces measuring device after an alteration of weight force there is warranted a "break-off" of the pivot pin in the respective associated bedding. The calibration test, which has to be carried out atypically in view of the normal measuring operation owing to existing regulations, demands the standstill of all aggregates generating vibrations, as was mentioned already above, and it necessitates furthermore that the metering vessel stresses the forces measuring device permanently, so that the alteration of the weight force effected in the calibration test by loading calibration weights must overcome in each test step the existing static friction. In particular in the case of very small weight force alterations the measuring sensitivity of the assembly in conventional bedding arrangements is noticeably impaired by the influence of static friction. The variation of the bedding according to the invention explained above is providing a remedy in this respect.

Another advantageous embodiment of the assembly according to the invention provides that the arrangement of the spring/stabilizing elements at the frame is such that the center of gravity of the frame to be stabilized lies on an imaginary plane extending through the spring/stabilizer elements. In such a manner there are minimized the moments of force resulting especially in the event of traverse vibrations and traverse movements, which moments of force are created by forces attacking in the spring/stabilizer elements and in the center of gravity.

In order to provide that the measuring result of the weighing within the framework of admissible tolerance is accepted as quickly as possible by the plotting device it is not sufficient to avoid only resonance phenomona between the exciting vibrations from outside and the inherent frequency of the system, but there must also be prevented that the fluent material fed into the metering vessel performs vibrating and swelling motions over a prolonged period of time. For this reason there is provided by a further advantageous embodiment of the assembly according to the invention that at least one baffle plate is provided in the metering vessel being oriented in the longitudinal axis of the metering vessel. In addition, there is provided by a further embodiment of the assembly according to the invention that several baffle plates are aligned radially towards the center of the metering vessel and on the one hand have them engage the jacket of the metering vessel and on the other hand to interconnect them in the center of the metering vessel. When the means for the radial fixing, as are proposed by another development of the assembly according to the invention, are disposed in the radial direction of the baffle plates and in their continuation outwardly, it becomes possible in a simple manner to introduce into the metering vessel the forces necessary for supporting the metering vessel without deforming it.

In order to ensure that the forces measuring device, the so-called weighing cell, is loaded only during the weighing of the metering vessel, there is provided by an advantageous further development of the assembly according to the invention that the metering vessel can be transferred into positions alternatingly relieving the forces measuring device from the weight force or loading it with the weight force.

This is achievable inter alia in that in accordance with a further advantageous embodiment of the assembly according to the invention a lifting device propped either directly or indirectly on the support plane engages either via the forces measuring device or directly at the metering vessel so that thereby the weight force of the metering vessel either can be imposed on the weighing cell or removed therefrom.

In order to free the weighing of the metering vessel of falsifying external effects of force it is provided according to another advantageous embodiment of the assembly of the invention that simultaneously with the transfer of the metering vessel to a position loading the forces measuring device with the weight force the section of the inlet conduit and/or the section of the outlet conduit is decoupled from the metering vessel. This is effected in a simple manner in that the lifting device described above upon displacement of the metering vessel for the purpose of loading the weighing cell simultaneously separates the inlet conduit section and/or the outlet conduit section from the metering vessel.

For the determination of the degree of inclination of the assembly according to the invention it is proposed by the invention to determine the degree of inclination of the support plane from the weight force component measurable via the forces measuring device of the emptied metering vessel and its actual weight force. When the metering vessel is in a precisely vertical orientation, the force exerted by gravity on the weighing device, or forces measuring means, is the weight of the metering vessel and its contents. When the metering vessel and its supporting structure are oriented at a slight angle to the vertical, the force exerted on the forces measuring means is not exactly the weight, but is a weight force component smaller than the weight. How much smaller depends on how great the angle is by which the direction of the displacement of the metering vessel varies from the vertical. A measure of this difference is given by an angle, which is the inclination angle. The weight of the metering vessel can be determined when the metering vessel has a direction of displacement which is vertical, for example, when the support for the vessel is resting on what is known to be a horizontal surface. When the weight has been determined once, it will always be the same and can serve as a reference for determining the angle of inclination. The degree of inclination can be determined from the actual weight of the metering vessel and the weight force component of the empty metering vessel as a part of the weighing operation. Especially in the assembly with a single metering vessel the measuring method described above results in the simplest feasible total assembly. A falsification of the degree of inclination is given indubitably by unavoidable residues of adhering milk in the metering vessel after its discharge. These residues of adhering milk, however, are reduced on the one hand by the time made available for emptying, on the other hand, they are estimable by a first approximation as a function of the time for emptying indicated above and hence is a reproducible value available for the correction of the measured value.

When the weight force component ($F_H^*$) is measured, as is provided by an advantageous further development of the process, after a defined and reproducible emptying time and processed in connection with the associated actual weight force of the vertically disposed and under the same conditions emptied metering vessel the falsifications of the measured value due to residues of adhering milk can to a large extent be compensated mathematically.

From DE—PS 35 45 160 is already known an assembly in which the inlet conduit section and the outlet conduit section are each connected to the metering vessel by means of an elastic tubing piece.

An advantageous further development of the assembly according to the invention provides that both the inlet and the outlet conduit sections are connected to the metering vessel via a coupling each. Thereby it is possible to carry out the weight force determination of fluent material stacked in the metering vessel completely free of external effects of force falsifying the measuring results.

The same advantage is achieved when, as is provided by a further advantageous embodiment of the assembly according to the invention, the section of the inlet conduit is entered into the metering vessel via a vessel aperture without contact and the section of the outlet conduit is connectable to the metering vessel via a coupling.

Another development of the assembly according to the invention achieves the same advantage in that the section of the inlet conduit is entered contact-free into the metering vessel via a vessel aperture and the section of the outlet conduit is either conducted away contact-free from the metering vessel by means of a collecting vessel or is conducted out of the metering vessel contact-free.

An advantageous embodiment of a process using an assembly according to the invention provides that with the fluent material to be transferred a metering system equipped with at least two metering vessels is loaded, emptied or partially emptied either alternatingly or in cyclic sequence, and that the mass of the loaded and emptied or partially emptied metering vessel is determined. By using such a procedural combination there are utilized on the one hand the advantages of the assembly according to the invention, on the other hand there are overcome the problems as to time caused by the discontinuous manner of operation occurring hitherto when using weighing systems.

A further advantageous development of a process using an assembly according to the invention, in which there are connected a first storage vessel to a metering vessel in upstream direction and a second storage vessel in downstream direction thereof, provides that the fluent material is advanced continuously into the first storage vessel and discharged continuously from the second storage vessel, and that the mass of the loaded and the emptied or partially emptied metering vessel is determined. By the storing of the fluent material to be transferred prior to and subsequently to the discontinuously chargeable metering vessel there is safeguarded a continuous transfer of the fluent material while the overall assembly in respect of the metering vessel and the forces measuring device takes the most simplified configuration feasible. In case the degree of inclination of the support plane is determined, as was described above, from the weight force component of the emptied metering vessel measurable via the forces measuring device and from its actual weight force, the assembly according to the invention can do with a single forces measuring device serving for both the weighing of the metering vessel and the determination of its inclination.

By means of the assembly according to the invention there can be solved, moreover, the problem which hitherto occurred and had to be tolerated in the transfer and mass separation of milk by known measuring assemblies. This is the so-called residual quantity problem in the advancing device connected ahead of the apparatus for mass separation as well as in the conduits connected subsequently to the advancing device, as far as in these conduits there is disposed a sample taking device. The said residual quantity, in the known assemblies, is entrained into the milk and thus into the milk specimen of the subsequent supplier if, as is strictly demanded in any event, the sample taking system is operated strictly representatively.

A process which can be performed only with the assembly according to the invention provides that the first advancing device, the subsequent section of the inlet conduit and the metering vessel are discharged free of effects of force via discharge conduits provided with shutoff means into a collecting vessel disposed at the metering vessel, that the residual quantity transferred into the collector is weighed with the following supplier and transferred free of effects of force via an outlet conduit provided with shutoff means into the outlet conduit section. By the process according to the invention there is, on the one hand removed the residual quantity of the instant supplier from the accepting system without being lost to the quantity balance. Since the subsequent supplier meets a "dry" accepting system and leaves a "wetted" system behind, this quantity of residual milk, which in good approximation represents a constant of the system, must be taken into account as to amount. This is done according to the invention in that the residual quantity can be discharged into a collector disposed at the metering vessel and weighed there. In the known assemblies operating volumetrically such a procedure cannot be realized since in such cases the residual quantity would have to be transferred upon the completion of the milk acceptance and mass separation into the apparatus for mass separation and there it would alter the cut-off level in an inadmissible manner.

The process proposed according to the invention not only permits the determination of the amount of the residual quantity but, moreover, safeguards that said residual quantity, at least prior to the sample taking site, is not admixed with the milk of the subsequent supplier. This is achieved in that the said residual quantity can be transferred via on outlet conduit into the outlet conduit section.

By means of the assembly according to the invention it is possible to solve nearly ideally the problem of taking samples which problem arises in the transfer and mass separation of milk, since a partial quantity representative of the filled-in amount and the substances contained in the fluent material can be taken from the metering vessel without great expenditure. In this respect it is proposed in aspects of process to take from each weighed metering vessel a partial quantity representative of the filled amount and the substances contained therein and transfer it into a testing precursor vessel, that the partial quantities are stacked therein and admixed with each other and that from the total quantity in the testing precursor vessel there is filled a specimen into a test tube and the residual quantity left discharged into the outlet conduit section. A partial amount proportional as to quantity and substances contained can be taken from the metering vessel without encountering any greater difficulties. In this respect it is obvious to use e.g. the known method of the removal by pipette or an improved device, such as is described e.g. in DE-OS 34 40 365. In case the fluent material to be transferred requires the loading of several metering vessels then there is taken a representative partial quantity from each loaded metering vessel and processed as described above.

The assemblies and the methods according to the invention described above for the quasi-continuous or discontinuous loading of the metering vessel are employable not only for beverages such as milk or beer but can be utilized wherever an exact mass determination and mass separation of fluent material is generally considered appropriate, is necessary or is demanded by regulations. The assemblies proposed according to the invention solve the problem of the transfer, mass determination and mass separation of fluent material, and this independently from the fact as to whether the fluent material is collected from several tanks and transferred into a joint container, or whether the fluent material is distributed from a joint container into several vessels.

The decisive factor is merely that during the collection or during the distribution of fluent material there is effected a mass determination and mass separation of the fluent material to be collected or distributed, respectively. Classic examples of utilization are represented on the one hand by the collection of milk from suppliers in a milk tank truck, or the distribution of draught beer from a mobile draught beer storage tank to usually stationary draught beer tanks of various customers at separate locations, e.g. restaurants. In both cases a mass determination has advantages over a volume determination since on the one hand during the collection of milk there are drawn in not inconsiderable amounts of air with the milk, and on the other hand during the distribution of beer the carbonic acid dissolved therein is liberated in gas form at a considerable rate upon pressure decrease.

The assembly according to the invention is explained in detail by means of examples of embodiment with reference to the figures of the drawing as follows.

There are shown in

A metering vessel 1 (FIG. 1) is journalled by means of an upper and a lower pivot pin $1i$ or $1j$, respectively, in a frame 21 by means of radial bearings 22a, 22b. Only in direction of its journalling axis the metering vessel 1 reveals a degree of freedom of displacement. The force component $F_H^*$ of the weight force F acting in direction of the journalling axis engages at a forces measuring device 18, the so-called weighing cell, and is measured there. In addition to the schematically shown classic bedding by means of antifriction bearings or slide bearings there is alternatively provided according to the invention also a bedding by means of a radial fixing of the metering vessel 1 with means 44, such as ropes or chains, which exclusively transmit traction forces between frame 21 and the metering vessel 1 (cf. FIG. 4).

Figure 1:
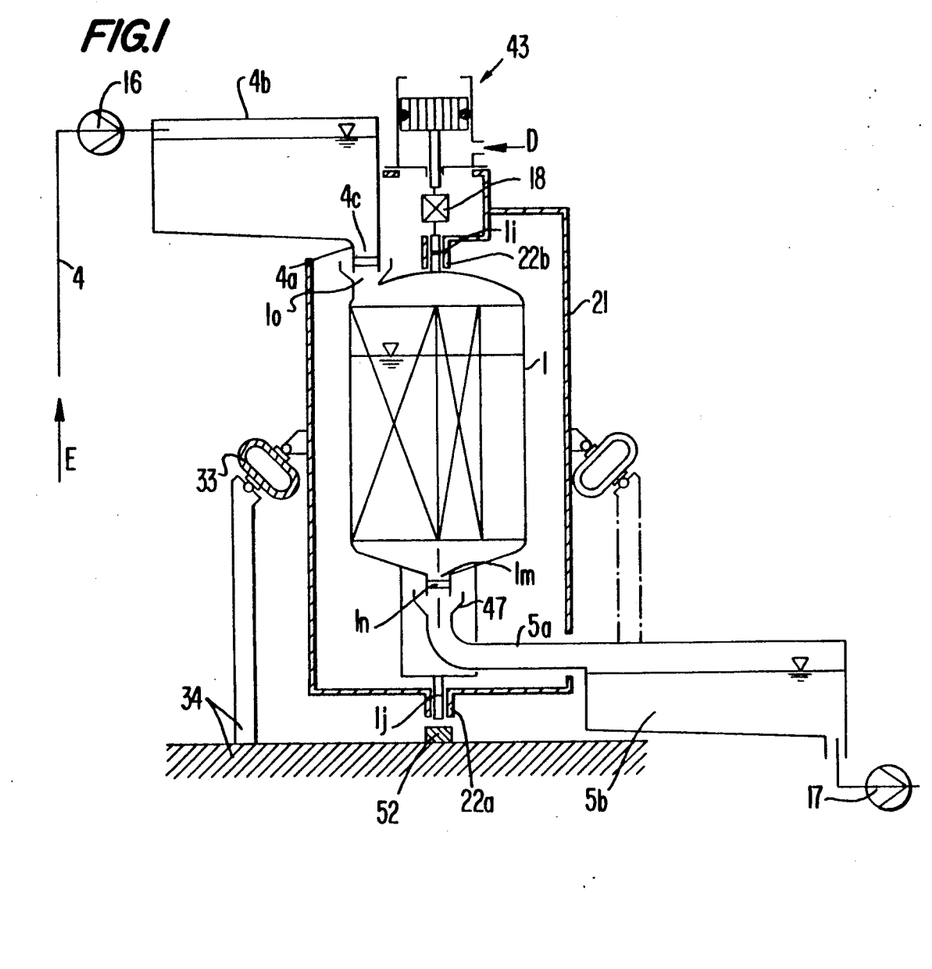
FIG. 1 an assembly according to the invention in a schematic view, wherein the metering vessel can be filled from a first storage vessel connected ahead thereof and emptied into a second storage vessel connected thereafter.

The measured value $F_H^*$ is delivered to a plotting device which is not shown. In an inlet conduit 4 there is disposed a first advancing device 16 with which fluent material, in particular milk or beer, is advanced from a first container, which is not shown, at first into a first storage vessel 4b and from there via a section of the inlet conduit 4a into the metering vessel 1. The section of the inlet conduit 4a enters contact-free via a vessel aperture $1o$ the metering vessel 1. Owing to this there are prevented effects of force from the inlet conduit 4 or the section of the inlet conduit 4a on the metering vessel 1. The first storage container 4b can be closed by means of a shutoff-device 4c in the section of the inlet conduit 4a.

The metering vessel 1 comprises in its bottom an outlet aperture $1m$ which is controllable by a shutoff device $1n$, which outlet aperture $1m$ enters contact-free a collector 47. The latter is connected via a section of the outlet conduit 5a with a second storage vessel 5b, to which there is connected a second advancing device 17. The forces measuring device 18 is loaded by the metering vessel 1 merely during the weighing. During the other process steps the forces measuring device 18 props itself via the lower pivot pin $1i$ on a support 52 by lowering itself by means of a lifting device 43. Symbol E designates the input stream flowing via inlet conduit 4 to the first advancing device 16 and from there into the first storage vessel 4b. The structural parts 33, 34, 43 and their functions are explained in detail in the description regarding FIGS. 2 and 2a.

Figure 5:
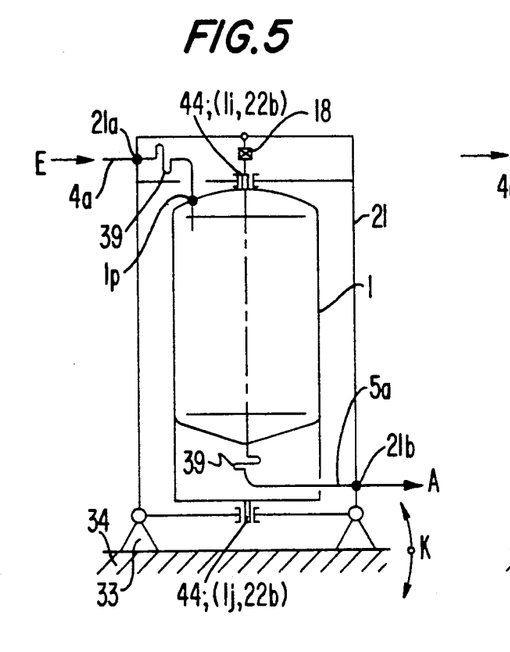
FIGS. 5a to 5c further assemblies according to the invention wherein the inlet to and the outlet from the metering vessel are designed differently.

According to the invention the inlet to and the outlet from the metering vessel 1 can be designed differently, too. Forms of embodiment in this respect are shown in FIGS. 5 to 5c explained below. It is not mandatorily necessary, either, that the section of the inlet conduit 4a, as shown in FIG. 1, enters the metering vessel 1 at its top. In contrast hereto there is feasible a conduit entering the metering vessel 1 from below and extending in the interior thereof e.g. up to the top region. Likewise the section of the outlet conduit 5a need not be connected to the bottom of the metering vessel 1. In case the fluent material can be sucked off the metering vessel 1 via a second advancing device 17 it will also be possible to conduct the section of the outlet conduit 5a upwardly out of the metering vessel 1, as is shown by the assemblies according to FIGS. 6a to 6c.

Figure 2:
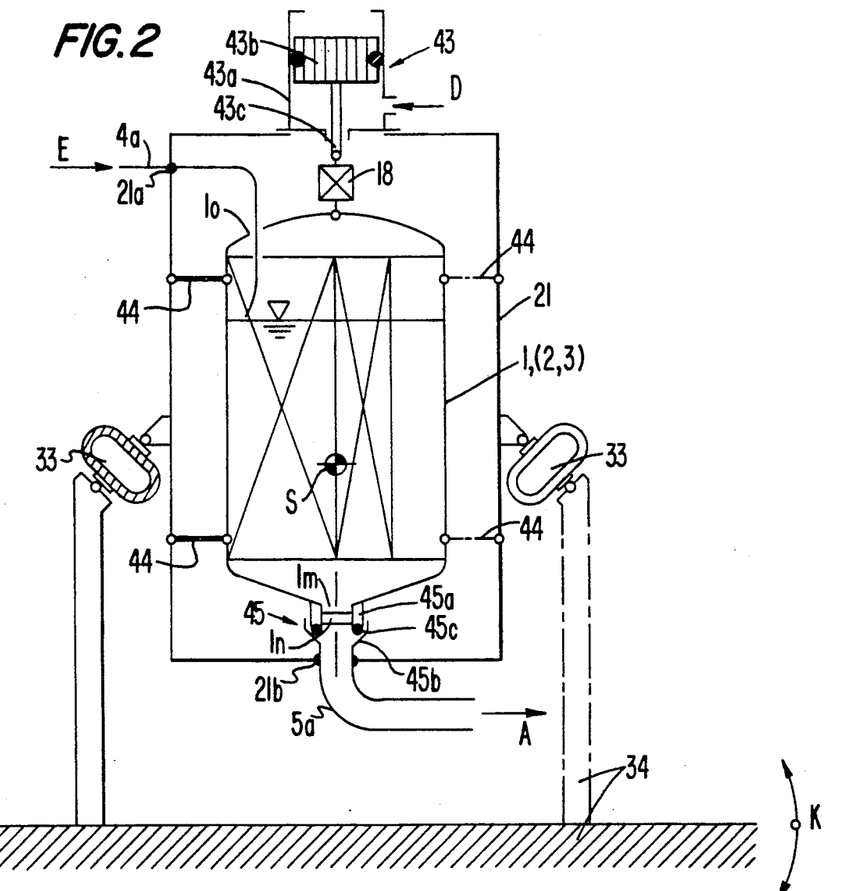
FIG. 2 a further assembly according to the invention in a schematic view with a metering vessel slidable by means of a lifting device.
Figure 2A:
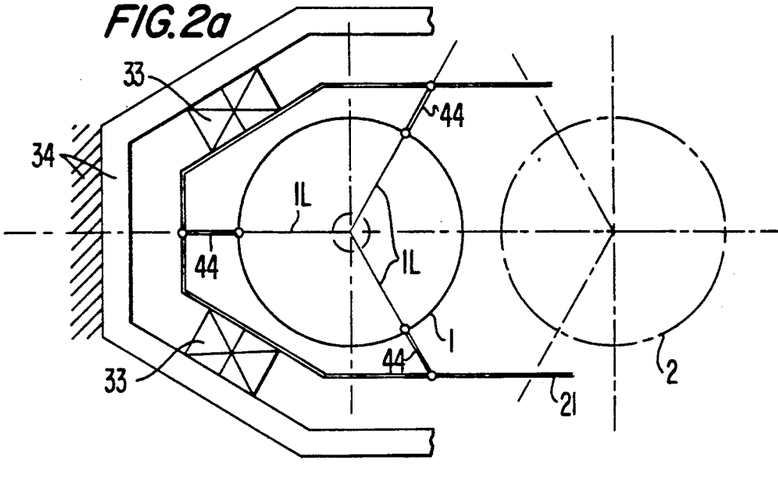
FIG. 2a a top view of the assembly according to FIG. 2.

In FIGS. 2 and 2a, there is schematically shown a further assembly according to the invention. FIG. 2 shows a view of the assembly in center section, wherein the spring/stabilizer elements 33, together with their bearing on the wheeled frame 34 were folded into the cutting plane, wherein the term "wheeled frame" refers to a frame intended to be moved about on wheels. FIG. 2a shows the top view of the above assembly.

In accordance with the invention the section of the inlet conduit 4a is entered contact-free into the metering vessel 1 via the vessel aperture 1o. The section of the outlet conduit 5a is connectable to the metering vessel 1 by means of a coupling 45 consisting of an upper and a lower coupling half 45a or 45b, respectively, and a seal 45c mutually sealing the coupling halves. The outlet aperture 1m of the metering vessel 1 exiting into the upper half of coupling 45a is controllable by means of the shutoff device 1n disposed therein.

The bedding of the metering vessel 1 is effected by means 44 which fix the metering vessel 1 radially to allow it a limited axial displacement free of the effects of force in direction of its symmetry axis. The means 44 engage on the one hand the metering vessel 1 and on the other hand frame 21, and they transmit exclusively traction forces. Preferably there are used steel ropes, the journalling and fixing of the proximal and distal ends of which will be described below. The means 44 engage the jacket of the metering vessel 1 in such a manner that they orient themselves in the radial direction of the baffle plates 1l and outwardly in their continuation. Since the baffle plates are disposed star-shaped and aligned radially to the center of the metering vessel 1 and interconnected there, there is achieved a favourable force input into the metering vessel 1 without incurring thereby the risk of a deformation of the jacket of the metering vessel 1.

While both the sections of the inlet conduit 4a and the outlet conduit 5a are firmly attached to the frame 21 by means of attachments 21a or 21b, respectively, the metering vessel 1 can be axially displaced by means of a lifting device 43. It consists of a cylinder 43a, a piston 43b and a piston rod 43c. The latter is connected with a forces measuring device 18, a so-called weighing cell, from this in turn there is suspended the metering vessel 1. The connections between the forces measuring device 18 and the piston rod 43c on the one hand and the metering vessel 1 on the other hand are made resiliently; they are only capable of transmitting traction forces. The piston 43b can be stressed within the cylinder 43a by means of a pressure fluid D, so that a limited axial lifting motion of the metering vessel 1 can be carried out. In case the lifting device 43 is not triggered the entire weight force of the metering vessel 1 including the fluent material possibly stacked therein is supported via coupling 45 on the section of the outlet conduit 5a. In this manner there is simultaneously achieved a safe seal of both coupling halves. The forces measuring device 18 is completely relieved from weight forces in this position. The metering vessel 1 can also be transferred via the lifting device 43 to a position in which the forces measuring device 18 is loaded with the weight force of the metering vessel 1. Simultaneously with this transfer the section of the outlet conduit 5a is decoupled from the metering vessel 1. In this weighing position thus reached the metering vessel 1 is completely free of falsifying external forces since the section of the inlet conduit 4a is likewise entered contact-free via vessel aperture 1o in the metering vessel 1. Of course there are also possible solutions in which the metering vessel 1 props itself on the weighing cell 18 while exerting pressure forces and in which the lifting device can be disposed also below the metering vessel 1.

In order to keep external forces away from the metering vessel 1 and from the forces measuring device 18 and also to have oscillating and surge motions perhaps excited in the system interior by the fluent material fed into the metering vessel 1 fade as quickly as possible, it is provided that the frame 21 is journalled by means of spring/stabilizing elements 33 in the overall assembly or on the wheeled frame 34, respectively, the spring/stabilizing elements 33 being arranged such that the center of gravity S of the frame 21 to be stabilized with all its components lies on an imaginary plane extending through the spring/stabilizer elements 33. By this arrangement it is possible to minimize to the utmost extent the moments of force built up from d'Alembert inertia forces attacking in the mass center of gravity and the reaction forces in the spring/stabilizing elements 33.

The inlet stream, designated by E, enters the metering vessel 1 by means of the section of the inlet conduit 4a. The filling of the metering vessel 1 and the limitation of the filling level are described in DE-PS 35 45 160. As was explained already above, the weighing is carried out in the illustrated assembly without force reactions from either the inlet conduit section 4a or the outlet conduit section 5a on the metering vessel 1, since the former in each phase of the filling or discharging process enters the metering vessel 1 contact-free and the latter is decoupled from the metering vessel 1 during the weighing. For the purpose of emptying the metering vessel 1 it must be re-connected with the outlet conduit section 5a by means of the lifting device 43, so that the outlet stream A can be transported via outlet aperture 1m, which is controllable by the shutoff device 1n, into the outlet conduit section 5a and from there into the consecutive parts of the assembly. By the symbol K it is indicated that the entire assembly or the wheeled frame 34, respectively, can perform spatial tilting or inclining motions, respectively.

In the top view (FIG. 2a) there is indicated a second metering vessel 2, which together with the metering vessel 1 can be filled and emptied or partially emptied alternatingly, so that a quasi-continuous transfer, mass determination and mass separation of fluent material can be carried out.

Figure 3:
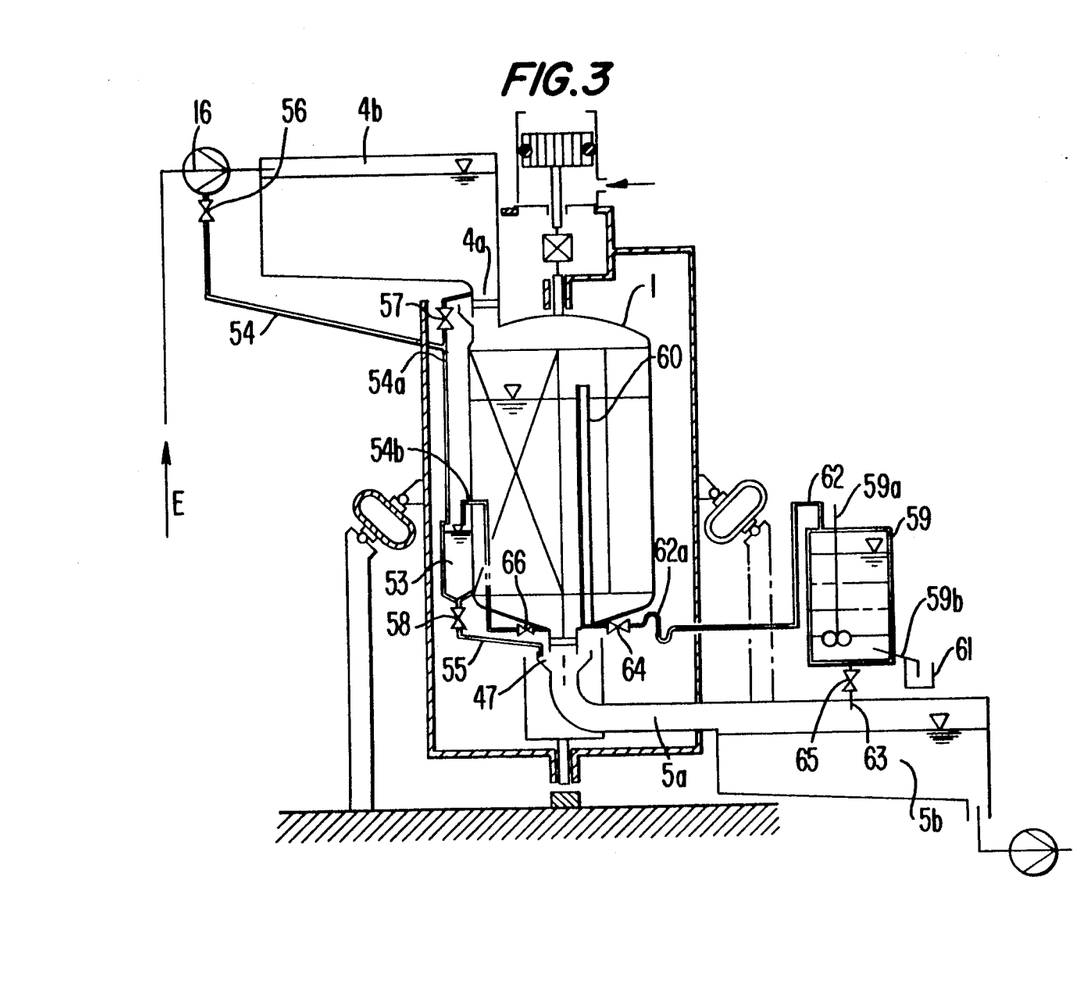
FIG. 3 an embodiment according to FIG. 1 with a device for processing the residual quantity and a second one for the taking of a representative specimen quantity.

FIG. 3 shows the assembly according to FIG. 1 with a device according to the invention for treating the residual quantity (shown on the left-hand side) and a further device for the taking of a representative specimen (shown on the right-hand side). A sample taking device known per se, which is not shown, is located usually following the first advancing device 16 (cf. left-hand side of FIG. 3). The residual quantity remaining in the system up to the sample taking device upon completion of the transfer of the fluent material, particularly in the first advancing device 16 and in the subsequent section of the inlet conduit 4a, is emptied within the period of time required for moving the assembly to the next supplier automatically via a first discharge conduit 54 into a collector 53. The first discharge conduit 54 is connected at the lowest point of the first advancing device 16 and is extending slopingly towards the collector 53. When disposing a first storage vessel 4b it is advantageous when the adhering milk quantity remaining in this storage vessel is collected at the lowest point, e.g. in the inlet conduit section 4a entering contact-free the metering vessel 1, and is also transferred via a second discharge conduit 54a to the collector 53. The collector 53 can be emptied via a first discharge conduit 55 into the collector 47 of the outlet conduit section 5a. The above-indicated conduits can be closed by means of shutoff devices 56, 57 and 58. The reasons for the handling of the residual quantities were explained above already.

The weighing of the residual quantity is effected with the following supplier and expediently during the mass determination of the first partial quantity of the fluent material to be transferred. The process according to the invention for the determination of the residual quantity guarantees a correct balance of quantity for each individual supplier without the fluent material, especially milk of different suppliers and of different quality, being mixed together prior to the sample taking. The above assembly according to the invention is not limited to the assembly with a single metering vessel 1 and with each one storage vessel 4b or 5b connected before or following it, but it can be integrated in any assembly according to the invention, in which said residual quantity can be transferred either automatically or even forcibly from the first advancing device 16 and the following conduits into a collector 53, weighed at the metering vessel 1 and subsequently transferred into the outlet conduit section 5a. In case the sample taking is effected from the metering vessel 1, as is described below with reference to the right-hand side illustration of FIG. 3, the determination of the residual quantity is extended to the determination of the residues of adhering milk remaining in the metering vessel. For this purpose there is connected at the lowest point of the metering vessel 1 a further discharge conduit 54b, which can be closed by a shutoff device 66, said discharge conduit 54b transferring the milk residues draining from the walls of the metering vessel and collecting them enroute to the next supplier into collector 53. The latter must in this case be disposed so low that on the one hand an automatic draining of the sump in the metering vessel is possible and on the other hand the automatic emptying of the collector 53 via the discharge conduit 55 into the outlet conduit section 5a is still possible as well.

The sample taking device shown on the right-hand side of FIG. 3 consists of a partial quantity taking device 60, a transfer conduit 62 connected by means of an elastic tubing section 62a, a testing precursor vessel 59 with stirring device 59a, an injection and decanting device 59b and a second discharge conduit 63 entering the second storage vessel 5b via a shutoff device 65. For instance, the specimen taking device 60 can be a known extraction device comprising an extraction pipe riser substantially extending over the entire filling level of the metering vessel 1, the pipe wall of which is provided with a longitudinal slot which is exposed by a closing member actuatable by driving means during the filling of the vessel and closed during the taking of a partial quantity representative of the vessel contents. The transfer of this partial quantity from the metering vessel 1 into the testing precursor vessel 59 is controlled by shutoff device 64 disposed in the transfer conduit 62.

Every filling of the metering vessel 1 supplies such a partial quantity proportional as to amount and substances contained, which is transferred into the testing precursor vessel 59 and stacked therein. Upon completion of the transfer of the total quantity of fluent material the partial quantities stored in the testing precursor vessel 59 are intimately admixed so that a sample specimen can be taken and filled into a testing precursor vessel 61. The remaining residual quantity in the testing precursor vessel 59 is subsequently discharged into the second storage vessel 5b. The testing precursor vessel 59 is expediently disposed so that the partial quantity to be extracted by means of the specimen taking device 60 can be automatically transferred into vessel 59 and that thereafter the residual quantity left therein is automatically discharged into the second storage vessel 5b.

In case already by the manner of loading the metering vessel 1 it is safeguarded that the fluent material contained therein reveals a homogenous distribution in respect of the substances contained, it will be possible for instance to recover the partial quantity proportional in quantity to the filling of the metering vessel also in a different manner. Since the mass of fluent material being in the metering vessel 1 is known at the point of time the partial quantity is extracted, it is possible for instance to take the partial quantity proportional to the filling quantity in the metering vessel 1 by means of a temporal triggering, depending on said contents, of the shutoff valve 64 in the transfer conduit 62 and transfer same into the testing precursor vessel 59.

Figure 4A:
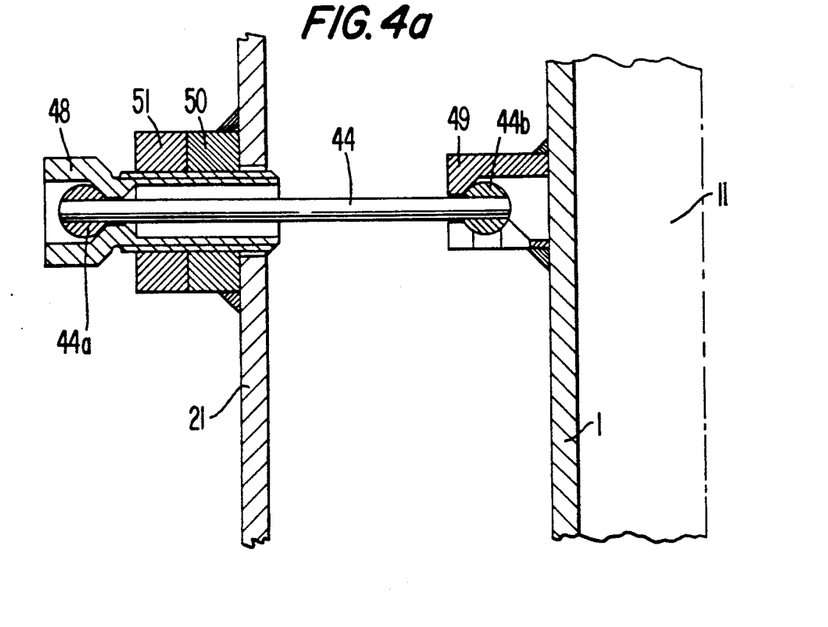
FIGS. 4a and 4b two alternatives of the bedding of the assembly according to the invention.
Figure 4B:
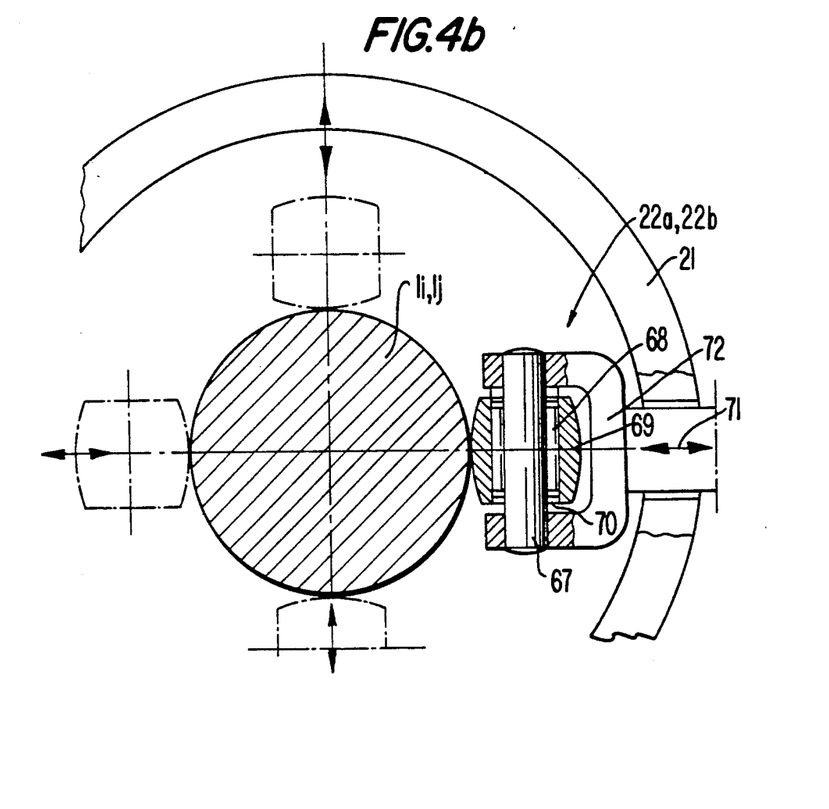

In FIGS. 4a and 4b there are schematically shown two variations of bedding of the metering vessel 1. The object of the invention is to support or journal, respectively, the metering vessel 1 in such a manner that it has a degree of freedom of displacement against the support plane or frame 21, respectively, only in direction of its weight force component $F_H{}^*$ measurable by the forces measuring device 18, the load cell. The displacement path required is extraordinarily short; it is within the range of millimeters. As a consequence there are feasible besides classic beddings by means of antifriction bearings or friction bearings also beddings in flexible diaphragms or by means of ropes or chains, respectively, or other means 44 transmitting only traction forces. The last named bedding is shown in FIG. 4b.

The metering vessel 1 is journalled within frame 21 by means for the radial fixing 44. The latter are preferably steel ropes, rope-like structures or chains which are only capable of transmitting traction forces and otherwise are elastic and/or easily deformable in all directions other than the traction direction. In the illustrated example of embodiment the steel rope 44 is oriented radially to the center of the metering vessel and has at its ends thickenings 44a or 44b, respectively, which preferably are applied to the rope form-closed and/or force-locked. The thickening 44b on the side of the metering vessel engages a rope bearing 49, which expediently is connected material-closed to the jacket of the metering vessel 1. The thickening 44a on the side of the frame props itself in a tensioning part 48, which is disposed adjustably within a nut 50 connected expediently material-locked to the frame 21. A counternut 51 guarantees that, once adjusted, both journalling and calibration of the metering vessel can be secured.

The means 44 for the radial fixing are expediently calibrated so that in the weighing position, in which the forces measuring device 18 is fully charged with the apparent weight force of the metering vessel 1, said means 44 extend vertically to the axis of the metering vessel and in respect of the vertical normal position of the metering vessel 1, are mounted just stress-relieved. In case of an inclined position of the overall assembly the means 44 for radial fixing must then take up only the normal share of force of the weight force (cf. DE-PS 35 45 160). Impairments of the measuring results by restoring forces owing to internal stress in the means 44 for radial fixing are thus excluded to the utmost extent. The upper and the lower pivot pins 1i or 1j, respectively, are each guided in frame 21 by at least three supporting rolls 69 (FIG. 4b). The supporting rolls 69, configurated preferably drum-shaped, are journalled via needle bearings 68 on a bolt 67 disposed within a prong 72. The needle bearing 68 has a permanent lubrication not requiring maintenance and is closed hermetically against external influence by a seal 70. The supporting roll 69, the needle bearing 68, the bolt 67, and the prong 72 jointly form the radial bearing 22a or 22b, respectively, which is adjustable within the frame 21 in radial direction for the purpose of calibration of the upper and lower pivot pins 1i or 1j, respectively, by a calibration means 71.

FIGS. 5 to 5c and 6 to 6c show assemblies according to the invention in schematical illustration, in which the inlet to and the outlet from the metering vessel 1 are configurated differently. The bedding of the metering vessel 1 within the frame 21 is schematically shown in all examples of embodiment in the same manner (44; 1i, 22b and 44; 1j, 22b), whereby it is intended to point to the necessity per se of a journalling of metering vessel 1, but not to a specific form of bedding. In FIG. 5 there are indicated all essential reference symbols necessary for the description. In the further figures there are designated only the modifications over the embodiment according to FIG. 5.

The metering vessel 1 (FIG. 5) is hinged on frame 21 by means of the forces measuring device 18. The inlet conduit section 4a is on the one hand firmly connected to frame 21 by means of the fastening 21a and on the other hand with the metering vessel 1 by means of fastening 1p. A resilient tubing section 39 provides that the inlet conduit section 4a can be connected to the metering vessel 1 without any effects of force to the utmost extent. The outlet conduit section 5a is likewise firmly connected on the one hand to the frame 21 by means of fastening 21b and on the other hand to the metering vessel 1, a further elastic tubing section 39 being interposed. The frame 21 is connected either directly or indirectly with the wheeled frame 34 substantially without any degree of freedom of motion of its own, at best having interposed spring/stabilizer elements 33. Thus the frame 21 together with the metering vessel 1 and all other aggregates is capable of reproducing almost unchanged a spatial inclining motion K. Symbols E and A designate the inlet stream and the outlet stream of the fluent material having been separated and its weight force having been determined in the metering vessel.

Figure 5A:
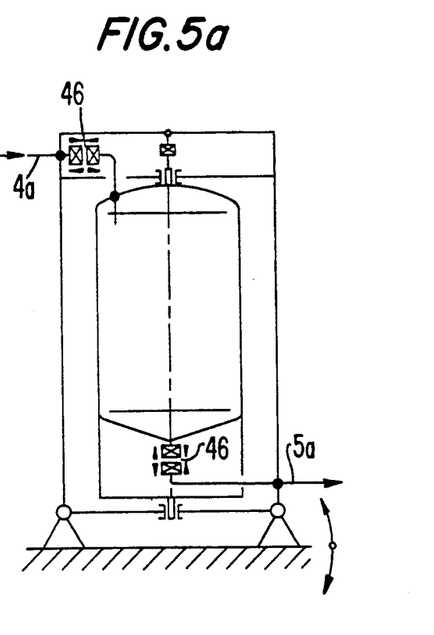

FIG. 5a shows an assembly according to the invention, in which both the inlet conduit section 4a and the outlet conduit section 5a are connected each to the metering vessel 1 by means of a coupling 46 or can be detached therefrom, respectively.

Figure 5B:
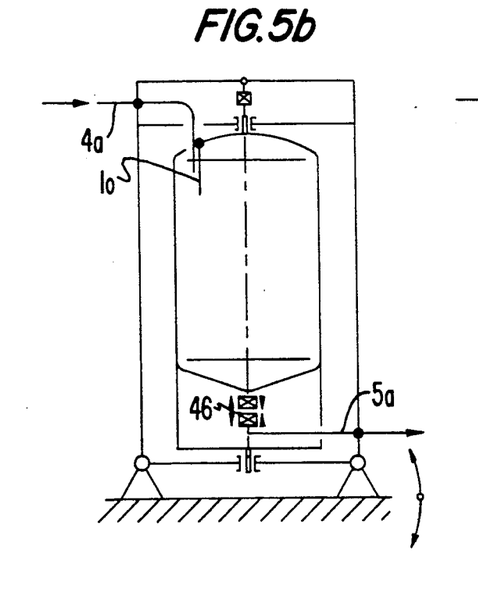
Figure 5C:
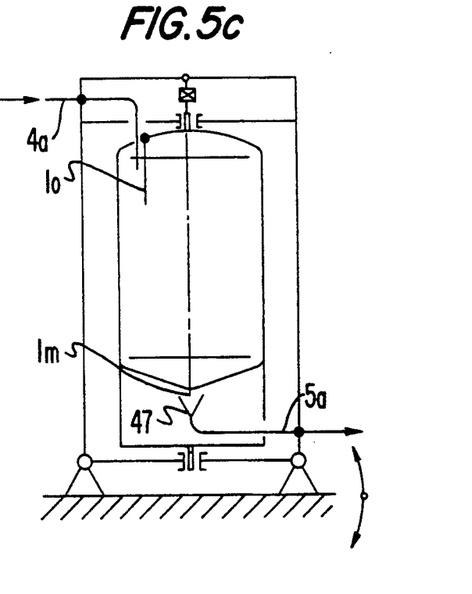

In the assembly according to FIG. 5b the inlet conduit section 4a as well as the outlet conduit section 5a are entered contact-free into the metering vessel 1 by means of the vessel aperture 1m. The outlet conduit section 5a is connectable to the metering vessel 1, as is the case in the assembly according to FIG. 5a, by means of coupling 46.

In the assembly according to FIG. 5c neither the inlet conduit section 4a nor the outlet conduit section 5a have at any point of time a connection with the metering vessel 1. The inlet conduit section is, in the same manner as in the assembly according to FIG. 5b, entered contact-free into the metering vessel 1. The outlet conduit section 5a at its end on the side of the metering vessel expands to form the collector 47, into which the controllable outlet aperture 1m of the metering vessel enters contact-free.

Figure 6:
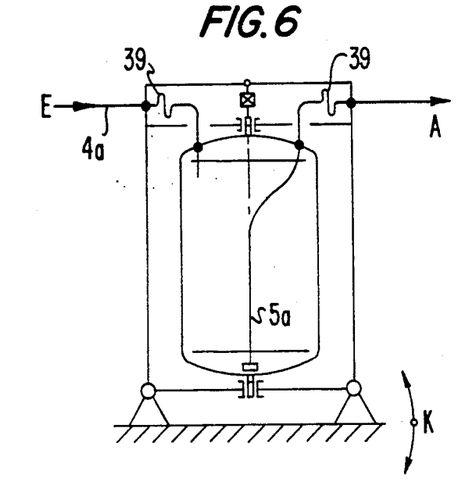
FIG. 6 to 6c other assemblies according to the invention, wherein both the inlet and the outlet are effected from above or upwardly, respectively, and are designed in the same manner as in the assemblies according to FIG. 5 to 5c.
Figure 6A:
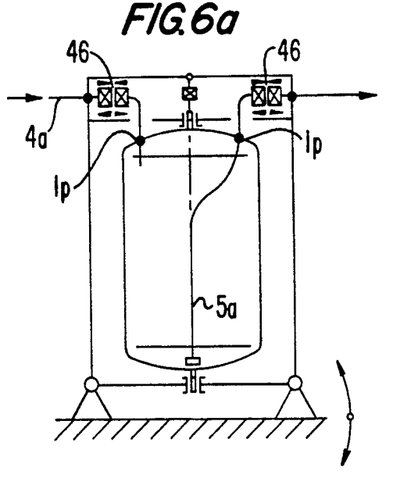
Figure 6B:
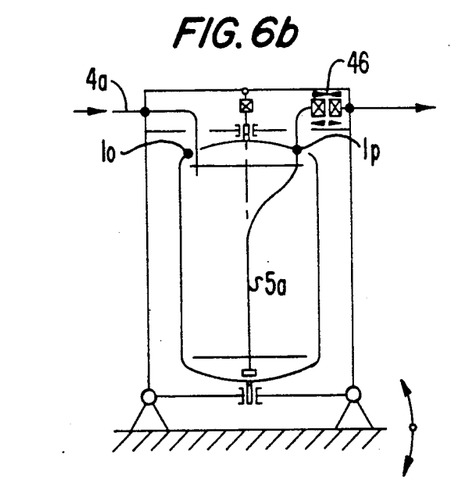
Figure 6C:
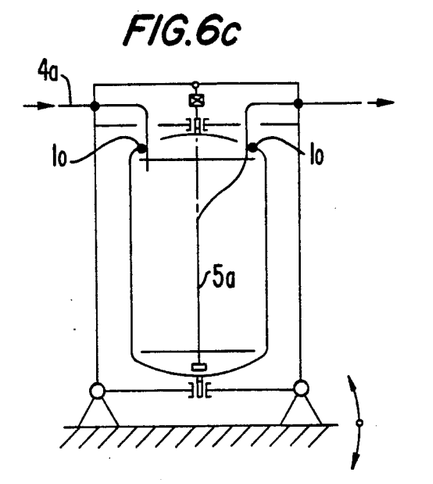

The assemblies according to FIG. 6 to 6c correspond to those of FIG. 5 to 5c, except that the outlet conduit section 5a is not disposed in the lower bottom region of the metering vessel 1 but is conducted out of the metering vessel in its upper top region. The solutions illustrated in FIG. 6, 6a, and 6b are identical with those shown in FIGS. 5, 5a, and 5b in respect of the configurations of both inlet and outlet conduit sections 4a or 5a, respectively in the region between the frame 21 and the metering vessel 1. In the assembly according to FIG. 6c, the outlet conduit section 5a as well as the inlet conduit section 4a are conducted out contact-free via vessel aperture 1o from the upper top region of the metering vessel 1.

Measuring instruments for the gravimetric mass determination in the sense of the assembly according to the invention detect the weight force of the mass to be determined. For this reason there is spoken in this context of a forces measuring device. In the simplest case this may be a spring scale. Modern, highly sensitive and very precise measuring devices work with the so-called elongation strips which supply a plottable signal proportional to the weight force. As forces measuring devices there are to be understood also such devices which work according to the principle of direct mass comparison.

In the simplest case this will be a beam balance, with which there is possible a direct mass comparison and and with which the mass to be determined is precisely measurable, independent of the slightly varying geometric location factor (ground acceleration due to gravity).

What is claimed is:

1. An assembly for the transfer, mass determination and separate handling of masses of fluent material, comprising:
    a first vessel, a metering vessel, and a second vessel arranged in series, each said vessel comprising a vessel designed to hold liquid;
    first means for connecting said first vessel and said metering vessel for a flow of fluent material therebetween, and second means for connecting said metering vessel and said second vessel for a flow of fluent material therebetween, whereby said metering vessel can be filled with fluent material from said first vessel and can discharge fluent material to said second vessel;
    forces metering means for measuring the weight force component of the metering vessel and any fluent material therein while taking into account any inclination angle with respect to the vertical, the weight force component being equal to the weight when the weight force component is vertical and being different from the weight when the weight force component is in a direction forming an inclination angle with the vertical; and
    support means for guiding said metering vessel for displacement in the direction of the weight force component of said metering vessel and for preventing movement of said metering vessel in any other direction, said metering vessel being supported by said forces metering means during weighing operation.

2. An assembly according to claim 1, wherein said first means comprises a first conduit extending from said first vessel and a second conduit extending from said metering vessel, said first conduit extending into said second conduit.

3. An assembly according to claim 1, wherein said support means comprises means for relieving from said forces metering means gravitational forces on said metering vessel when weighing operations are not taking place.

4. An assembly according to claim 3, further comprising means for moving said metering vessel from a first position in which gravitational forces on said metering vessel are borne by said support means and a second position in which gravitational forces on said metering vessel are borne principally by said forces metering means.

5. An assembly according to claim 1, wherein said support means comprises means in engagement with the metering vessel for exerting on said metering vessel exclusively traction forces.

6. An assembly according to claim 1, wherein said support means comprises a first pin secured to an upper surface of said metering vessel, a second pin secured to a lower surface of said metering vessel, and a plurality of rollers in engagement with each said pin.

7. An assembly according to claim 1, further comprising at least one baffle plate in said metering vessel, said baffle plate being oriented parallel to a longitudinal axis of said metering vessel.

8. An assembly according to claim 7, wherein said baffle plate is aligned radially with respect to the center of the metering vessel.

9. An assembly according to claim 8, wherein said metering vessel has a wall, and a plurality of baffle plates are interconnected at the center of said metering vessel and are in engagement with the wall of said metering vessel.

10. An assembly according to claim 1, wherein said support means is a frame.

11. An assembly according to claim 10, wherein said frame is supported on spring stabilizer elements.

12. An assembly according to claim 11, wherein said frame has a center of gravity lying in a plane extending through said spring stabilizer elements.

* * * * *